United States Patent [19]

Fava

[11] 4,151,090
[45] Apr. 24, 1979

[54] UNITARY PACKAGE FOR WATER TREATMENT FOR ATTACHMENT TO HOME HOT WATER HEATER

[76] Inventor: Miguel F. Brigante, 16550 NW. 10th Ave., Miami, Fla. 33169

[21] Appl. No.: 855,951

[22] Filed: Nov. 30, 1977

Related U.S. Application Data

[63] Continuation-in-part of Ser. No. 474,580, May 30, 1974, abandoned, and Ser. No. 672,819, Apr. 1, 1976, abandoned, which is a continuation of Ser. No. 474,580, , abandoned.

[51] Int. Cl.² ............................................. B01D 35/06
[52] U.S. Cl. ..................................... 210/222; 210/243
[58] Field of Search ....................... 210/42 S, 222, 223, 210/243; 336/96; 363/62, 125, 126, 146; 366/280, 320

[56] References Cited

U.S. PATENT DOCUMENTS

| | | | |
|---|---|---|---|
| 1,949,660 | 3/1934 | Roberts | 210/223 X |
| 2,596,743 | 5/1952 | Vermeiren | 210/222 |
| 2,652,925 | 9/1953 | Vermeiren | 210/222 |
| 2,825,464 | 3/1958 | Mack | 210/222 |
| 2,939,830 | 6/1960 | Green et al. | 210/42 S X |
| 2,943,845 | 7/1960 | Jaklitsch | 366/280 X |
| 2,990,497 | 6/1961 | Rugg | 336/96 X |
| 3,237,079 | 2/1966 | Mas | 363/126 X |
| 3,463,319 | 8/1969 | Moragne | 210/223 |
| 3,478,494 | 11/1969 | Lustenader et al. | 210/243 X |
| 3,941,700 | 3/1976 | Sundt | 210/223 |

FOREIGN PATENT DOCUMENTS 408798 11/1972 Spain ......................................... 210/222

Primary Examiner—Robert H. Spitzer
Attorney, Agent, or Firm—Abraham A. Saffitz

[57] ABSTRACT

A unitary package for water treatment for attachment to a home hot water heater which is adapted to be easily serviced and readily monitored by the homeowner. The water treatment device is an electrical machine especially adapted for separating magnetic particles in feed water pipes to home hot water heaters and the like. The electrical parts for operating the machine comprise a transformer fitted with a safety fuse in the primary winding thereof which steps down incoming household line voltage from 110–125 volts AC to about 24±4 volts DC in the secondary winding. The secondary winding provides a constant DC voltage to an electromagnetic coil surrounding the inlet pipe. The inside of the inlet pipe is fitted with a special spiral band impeller or a solid helical impeller which rotates only when the water flows. The spiral band and the helical impeller are made of ferromagnetic material and are very close (about 1/16 inch) to the wall of the inlet pipe thereby sweeping in a broom fashion the inner wall free from particles which tend to deposit on the wall. The magnetic unit is a separate part of the package, separated from the transformer. A monitoring light is connected to the secondary winding to show that the circuit from the electromagnetic field is live. The package unit and pipe can be fitted by the homeowner into the water line.

14 Claims, 5 Drawing Figures

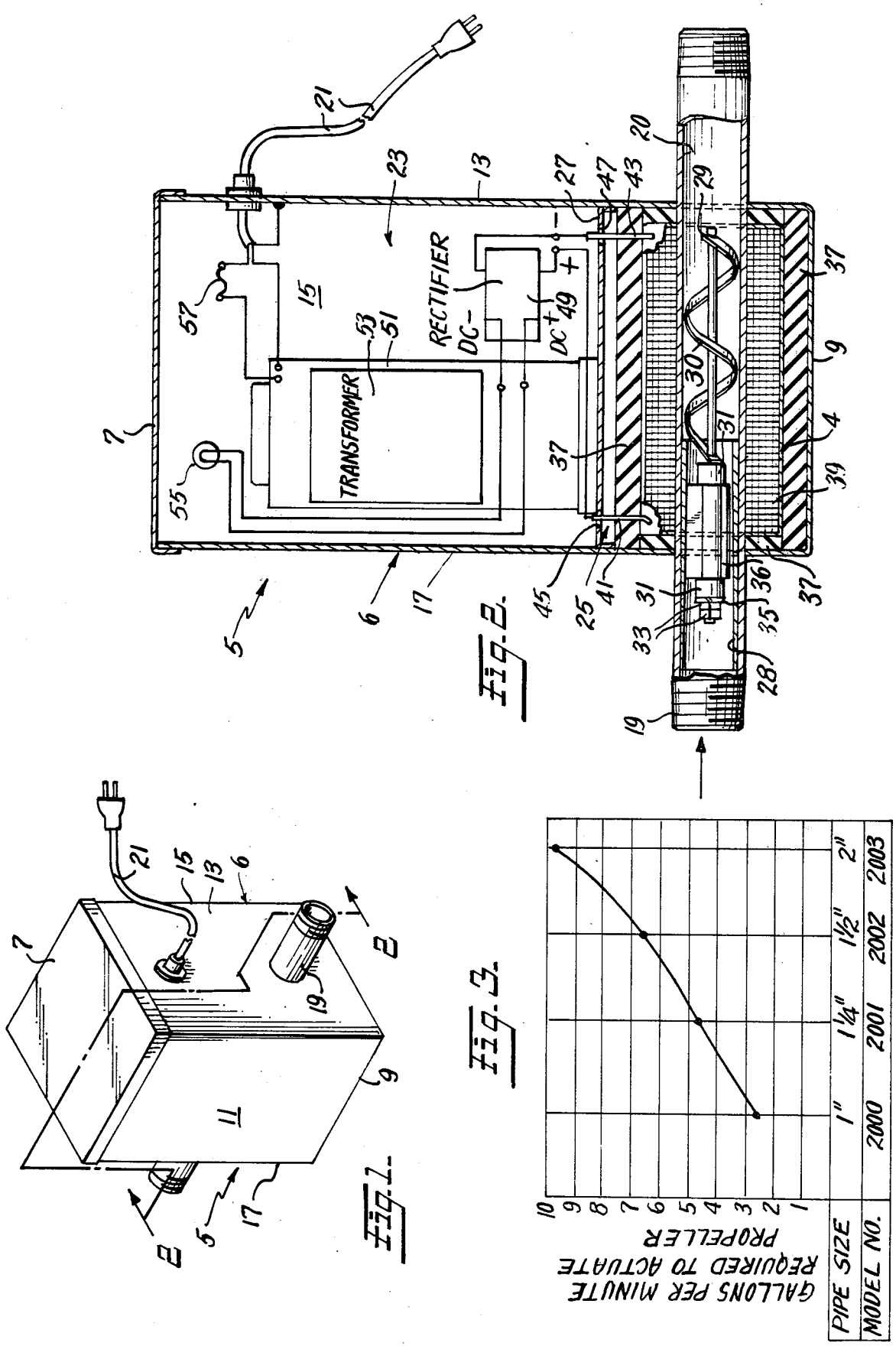

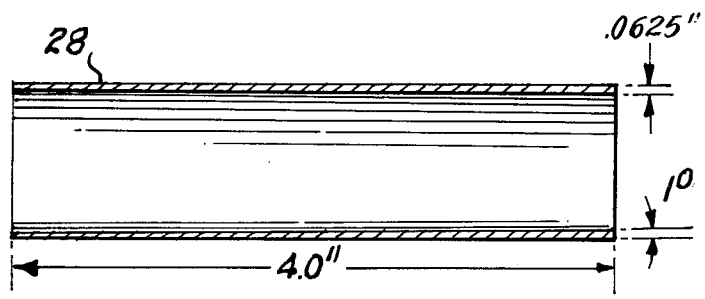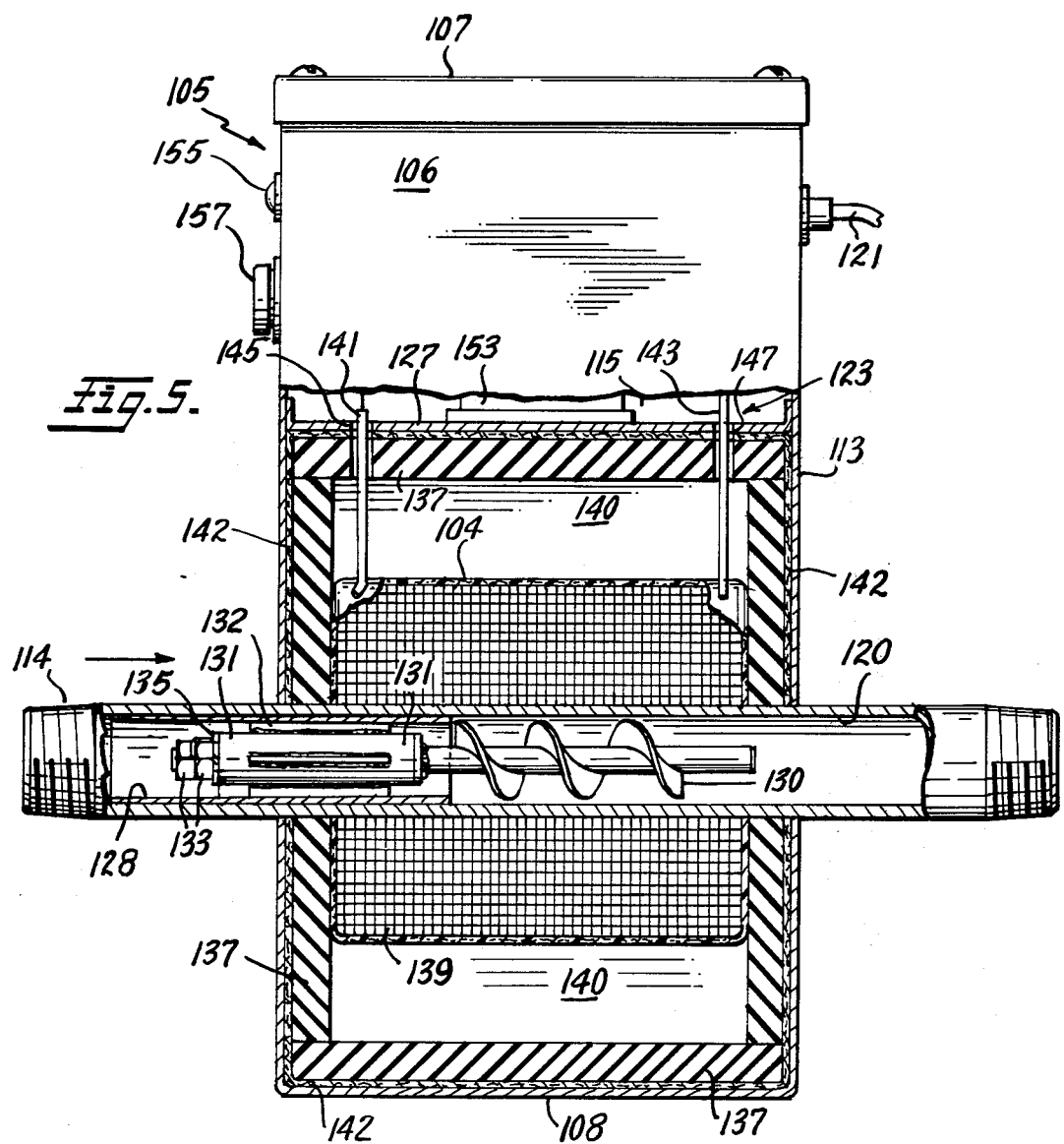

UNITARY PACKAGE FOR WATER TREATMENT FOR ATTACHMENT TO HOME HOT WATER HEATER

RELATIONSHIP TO PRIOR APPLICATIONS

This application is a continuation in part of my prior application, Ser. No. 474,580, filed May 30, 1974, now abandoned, and copending Ser. No. 672,819, filed Apr. 1, 1976 a continuation of Ser. No. 474,580 and now abandoned.

BACKGROUND OF THE INVENTION

1. Field of the Invention

This invention lies in the general field of liquid purification and separation apparatus wherein a magnetic treatment means, in this instance an electromagnetic coil about the outside of the inlet pipe containing feed water being treated, is provided for the prevention of deposits by suspended particles in the feed water influenced by said magnetic treatment means. This primary magnetic treatment is combined with an additional separating means comprising an elongated ferromagnetic spiral band impeller responsive to feed water flow and pressure closely fitting within the inlet pipe to sweep away the magnetically attracted particles.

The invention also lies in the field of special containers for electrical conversion machines, in this instance a step-down AC-DC transformer-rectifier which is separately housed in the special container in accordance with the Underwriters Electrical Code, to be separately accessible for installation, repair and maintenance from the electromagnetic coil means and the pipe unit containing the spiral band impeller, this special container enhancing and facilitating home hot water heater operations by preventing the build up of harmful deposits. Thus, one chamber of the multi-chamber unitary unit serves to house the electrical subassembly of electrical step-down transformer-rectifier, safety fuse, pilot light and incoming lead from the house line at 110–125 volts AC while the other chamber of the multi-chamber unitary unit serves to house the electromagnetic coil, pipe unit and spiral band impeller at a location below the first electrical subassembly.

2. Brief Description of the Prior Art

The concept of a separately packaged electromagnetic water treatment device which separates the power source from the electrical conversion machines, e.g., electromagnetic separator, used to treat the incoming water is shown in FIG. 4 of the patent to Moragne, U.S. Pat. No. 3,463,319. This patent shows, in FIG. 1, electrical coils 80 secured about a conical separator 10 which functions for the removal of salt or other elements from sea water. In FIG. 4 a battery of such separators, each with its coil, is fed from a Salt Water In source through a pump and the power source for the coils is located at a remote location.

Another teaching of an electrical conversion subassembly used for water treatment separated from an electrical transformer circuit is shown in Roberts, U.S. Pat. No. 1,949,660. In FIG. 1 of this patent there is shown a high frequency generator and transformer coupled to an electromagnet which together impress electrical and magnetic fields on a liquid tubular housing 30 through which an emulsion passes. These combined fields break the emulsion.

In neither Roberts nor Moragne is there a teaching of a unitary special package for the machine adapting the electrical conversion subassembly to be fitted into one compartment of the package and the magnetic assembly and special conduit type-container for water treatment to be fitted into another compartment of the package.

Other prior patents showing apparatus for magnetic treatment of a flowing liquid include U.S. Pat. No. 3,941,700 to Sundt, U.S. Pat. No. 2,596,743 to Vermieren, and U.S. Pat. No. 2,939,830 to Green, et al.

Green, et al, is like Moragne and separates the electrical AC source and transformer from the electromagnetic separator unit. No unitary unit package for both subassemblies is provided nor contemplated. A special H shaped magnet is used in combination with alternating North and South poles in successive desks energized by the electromagnetic coils to provide the magnetic water treatment.

Sundt shows a conduit-type container which is a unitary device per se, comprising in one chambered portion annular cylindrical permanent magnets 10 within tubular member 8 and in another upper chambered portion a conduit intake and a conduit outlet, each communicating with the magnet. This unit has the disadvantage of requiring disassembly of a sieve at the bottom of the unit and further disassembly of the magnetic annular assembly for installation, inspection and monitoring.

Vermieren has no teaching of a unitary special package comprising a subassembly of transformers and fuses in one compartment and a conduit-type casing for the magnetic treatment of flowing water in another casing although a transformer 13 and fuses 14 are shown. The output of the transformer produces an alternating magnetic field by energizing solenoid 4. Water flows into the unit in a vertical center pipe 1, out into annular space 6, reversing direction at the top of center pipe 1, then again reversing direction at the bottom of space 6 to enter space 7. The water being treated takes a sinusoidal path of very high amplitude.

Thus, in none of the closest patents found in the prior art is there a teaching of a unitary package of electrical machine for separating magnetic and like particles in feed pipes to home hot water heaters and the like in which the package is divided into several compartments, one compartment for the electrical conversion AC-DC transformer machinery, e.g., transformer, fuses, house line voltage plug, monitoring light and circuitry, and another for the conduit-type subassembly which magnetically treats the water flowing in a direct and straight line from an incoming city water pipe straight through to the inlet pipe of the home hot water heater or boiler in the home or laundry.

In connection with the concept of a secondary mechanical action aiding the magnetic treatment of water flowing in a conduit-type housing, attention is invited to Vermieren, Australian Pat. No. 145,850 published Feb. 16, 1950 and accepted Mar. 24, 1952. This patent shows apparatus for magnetic treatment comprising magnetic circuits formed of a plurality of solenoids vertically stacked in a manner similar to the United States patent to Vermieren above. Liquid jets 7 cut into the annular space between the solenoids through which the water passes. These jets serve to augment in a mechanical fashion the action of the magnetic lines of force existing in the space between the solenoids.

In contrast, the present invention uses an auxiliary action of sweeping by the impeller movement of a close fitting screw or spiral band impeller made of ferromagnetic material.

This sweeping action in the present invention results in a flow between the outer screw flight and the inner pipe surface which lies in a direct straight line path parallel to, as well as along, the side of the center axis of the pipe section constituting the conduit type housing in the lower compartment of the package.

OBJECTS OF THE INVENTION

An object of the invention is to provide a unitary special package for water treatment adapted to be attached to a home hot water heater or boiler in which package a separate upper compartment is provided for an electrical conversion AC-DC machine and its Underwriter approved safety features and a separate lower compartment is provided for a magnetic treatment unit comprising a conduit-type housing for direct straight line flow of water being treated by an electromagnetic coil about the housing and an inner close fitting ferromagnetic spiral band elongated impeller mounted within the housing to respond to water flow and sweep the inner wall, thereby preventing depositing of particles suspended in the feed water.

A further object of the invention is to provide novel mechanical mounting means for the efficient placement of the electrical conversion parts in the upper compartment and the efficient placement of the magnetic coil in the lower compartment to improve access to the essential parts of the package for installation, inspection, maintenance and repair.

Still another object is to provide novel mounting means which permit easy modification of either one of the subassemblies in the upper or lower compartment whereby a larger diameter of standard schedule pipe may be substituted for a smaller diameter standard schedule pipe part of the conduit-type housing, or a newer and more efficient electrical conversion machine or a new part therefor may be substituted for the older conversion machine in said upper compartment.

Still a further object of the invention is to provide an improved mounting means for the secondary magnetic sweeping device comprising the closely fitting inner elongated spiral band or screw impeller to provide for optimum and secure placement of said band within the conduit pipe, this improved mounting means constituting a tapered sleve of predetermined length and slope configuration and which is easily removable.

Still another object is to provide a simpler auxiliary mechanical sweeping movement than the jet turbulent action in Vermieren, Australian Pat. No. 145,850, which is uniquely adapted to be packaged within a short standard schedule pipe housing constituting the lower unit of the special compartment in a unitary package for home installation for a hot water heater or boiler.

Still another object is to provide an assembly unit adapting the precise location of the impeller which may be a spiral band or a helical screw.

A further object of the invention is to provide a new unitary package for water treatment which takes the applications of my co-pending application Ser. No. 672,819, filed Apr. 1, 1976, which is a division of my earlier application Ser. No. 474,580, filed May 30, 1974, the co-pending application having the title *Magnetic Apparatus Comprising an Electromagnetic Coil Surrounding A Feed Water Inlet Tube Having an Electrical Winding About the Tube and a Ferromagnetic Helix Closely Fitting Within the Inside of the Tube Rotating in Response to Water Pressure.*

Still a further object of the invention is to provide a special package adapted in its lower compartment for direct straight line flow within a constant magnetic field in a conduit type casing interposed between a city water outlet and the home feed water inlet into the boiler, the package being simply coupled and fitted.

Other and further objects will be apparent from the drawings and following descriptions.

SUMMARY OF THE INVENTION

A special multi-chambered unitary container comprising in a first chamber an electrical conversion machine, in this instance a step-down AC-DC transformer which is separately housed in the special container in accordance with the Underwriters Electrical Code, to be separately accessible for installation, repair and maintenance from the electromagnetic coil means and the pipe unit containing the spiral band impeller, this special container enhancing and facilitating home hot water heater operations by preventing the build up of harmful deposits. Thus, one chamber of the multi-chamber unitary container serves to house the electrical subassembly of electrical step-down transformer, safety fuse, pilot light and incoming lead from the house line at 110-125 volts AC and a second chamber of the unitary container which serves to house the electromagnetic coil, pipe unit and spiral band impeller at a location below the first electrical subassembly.

In my prior applications, Ser. Nos. 474,580 and 672,819, filed May 30, 1974 and Apr. 1, 1976 respectively, there is illustrated, described and claimed a conduit-type casing which is flanged at both ends, for bolt fastening and fitting to a correspondingly flanged industrial water inlet pipe. The electromagnetic coil wound about the conduit-type casing is energized by DC from a transformer at a remote station and an industrial voltage control unit serves to handle line voltages higher than 110-125 volts AC to the primary winding. The present improvement in special packaging and in the mounting features for the auxiliary magnetic device, e.g., the elongated impeller within the conduit-type casing, provides a new special package structure uniquely adapted for 110 volt AC home installation to hot water heaters and boilers.

BRIEF DESCRIPTION OF THE DRAWINGS

FIG. 1 shows an elevation view in perspective view of the preferred embodiment of the invention comprising a unitary package of the electrical machinery water treatment device illustrating the external aspects of the package;

FIG. 2 is a sectional view along section lines 2—2 of FIG. 1 with certain parts broken away to show details of construction in the electrical machinery contents of the lower compartment of the special package and also showing the special electrical conversion machinery and safety features in the upper part of the package;

FIG. 3 is a graph relating the flow in gallons per minute in the incoming home water line which travels in a straight line through the standard schedule conduit-type casing as related to the pipe diameter in the pipe sizes used (1"-2") for the home installation, this flow serving to actuate the impeller and thereby provide the secondary magnetic treatment and sweeping action in response to water flow;

FIG. 4 is an enlarged longitudinal sectional view of the assembly tube locating the impeller within standard schedule pipe constituting the casing in the lower compartment; and FIG. 5 is an elevational view, partly in section of a modification of the water treatment device.

DESCRIPTION OF PREFERRED EMBODIMENTS OF THE INVENTION

In a preferred embodiment of the invention which is shown in FIGS. 1 and 2, the unitary package 6 is in the form of a two compartment rectangular box formed of rectangular top wall 7, corresponding rectangular bottom wall 9, rectangular side walls 11 and 15 which are of like dimension and opposite each other, and rectangular side walls 13 and 17 which are also of like dimensions.

For reasons of economy, efficiency and ease of manufacture the unitary package 5 is formed of upper and lower compartments 23 and 25 and is rectangular but obviously any polygonal or even cylindrical shape may be used. The unitary package 5 is formed of the box 6 and the top cover or top 7. The rectangular shape which is dimensioned as indicated below is preferred for package 5.

The dimensions of these walls in the preferred embodiment which have proved to be highly efficient in the standard home model manufactured under the Model No. 2000L are as follows:

| Top 7 | 8" × 12" |
|---|---|
| Bottom 9 | 8" × 12" |
| Right Side Wall 11 | 8" × 23¼" |
| Back Side Wall 13 | 12" × 23¼" |
| Left Side Wall 15 | 8" × 23¼" |
| Front Side Wall 17 | 12" × 23¼" |

As shown in FIGS. 1 and 2 the lower compartment 25 which is the smaller compartment of the unitary package 5 houses the pipe 19 in which the rotating impeller means 29 is mounted. The rotating impeller means 29 constitutes the secondary magnetic treatment responding to water pressure. The primary magnetic treatment means is the DC energized electrical coil 39 wound about the entire longitudinal portion of the pipe between side walls 17 and 13 of the rectangular unitary package 5. The primary electromagnetic treatment results from tightly wound coil 39 which is insulated by encapsulation with a resin consisting of styrene polyester reinforced with chopped fiber glass ranging in size from ⅛ inch to 1/32 inch long. About 1000 turns of aluminum magnet wire energized by 4 amperes at 24 volts DC surrounds a 1 inch diameter pipe 19. This impregnated coil, after curing, is housed within the coil housing 4 and provides a water tight package comparable to the package described for FIG. 5 in a later part of this description.

The secondary magnetic treatment responding to water pressure is created by rotation of impeller means 29, the impeller means comprising a helical band 30 terminating at the end of the rotating shaft and journaled in bearings 31 which constitute the conventional self lubricating graphite bearings held at the end by a lock nut 33 and a lock washer 35.

The ends of the pipe 19 extend on each side of the unitary package 5 from the bottom compartment 25 thereof and as shown in FIG. 2, are threaded. Thus, each of the projecting ends extending on each side of the unitary package 5 provide easy coupling by means of a collar.

The preferred form of connection between the boiler line and the package 5 and between the city water line and the threaded ends of pipe 19 in the unitary package 5 is by means of a collar which joins the threaded end at the lower left of FIG. 2 to the city water line and the threaded end at the lower right of FIG. 2 to the boiler line.

In the Model 2000L which is a preferred commercial form, the extent of the projection at each end of the pipe 19 may be judged from the scale shown in the drawing, pipe 19 in the model 2000L being 1 inch pipe. This projection facilitates easy installation using standard plumbing and pipe fittings.

As shown in FIG. 2, the upper compartment 23 of the unitary package 5 is connected to the 110 volt AC line fuse 57, step down transformer 53, full wave rectifier 49 and DC leads 41 and 43, the pilot light 55. The step down transformer 53 is mounted in side wall 15 an reduces the voltage to 24 volts which is fed into rectifier 49 and then to leads 41 and 43. These leads are fed through openings 45 and 47, respectively, in partition 27 and are in turn connected to electromagnetic coil 39.

The embodiments shown in FIGS. 2 and 5 differ from each other in the proportioning of the upper compartment and the lower compartment.

In FIG. 2 the upper compartment 23 takes up about two-thirds of the unitary package and the lower compartment 25 the remaining one-third, thereby adapting the unitary package 5 for connection to a very low city water inlet and low boiler inlet connection.

In FIG. 5 the upper compartment takes up one-third of the unitary package and the lower compartment the remaining two-thirds which is the more preferred embodiment.

In FIG. 5 the four inner walls, top and bottom of the tower compartment are insulated with relatively thick absorptive mineral wool insulation specially adapting the package for high moisture environments. However, all of the essential features of the special package are also found in FIG. 2. The barrier separating the upper compartment 23 from the lower compartment 25 has the same general configuration in FIGS. 2 and 5 and performs the same function but only its placement varies in these special low and regular preferred embodiments. Openings 45 and 47 permit the end leads of the coil, 41 and 43, to pass through the barrier for the connection to the electrical circuit elements, e.g., the transformer 53, fuse 57, on the lead 41, and the rectifier 49 and operating light 55 on the lead 43.

The standard schedule pipe size which is used for the different sizes of boilers is shown in the graph in FIG. 3. Thus, the 1" diameter pipe corresponds to the conduit 19 of Model No. 2000L, 1¼" diameter pipe corresponds to the conduit 19 of Model No. 2001L, 1½" diameter pipe corresponds to the conduit 19 of Model No. 2002L, and 2" diameter pipe corresponds to the conduit 19 of Model No. 2003L. These are all conduits of uniform diameter into which the assembly device of the type shown in FIG. 4 is fitted.

The relationship between the diameter of the impeller and the inner diameter of the pipe, the impeller dimensions and the helical contour of the spiral band or of the screw impeller providing the responsive surface which rotates are a result of water flow as shown in FIG. 3. Water flow is expressed in either feet per second or gallons per minute and the dimensions of diameter, clearance between impeller and pipe, and water pressure are all critical parameters which determine the efficiency of the secondary magnetic and sweeping action provided by the rotation of the impeller.

The sweeping action is due to the placement of the outer surface of the helix band or screw close to the inner wall, e.g., about 1/16", and the water flow shown in the FIG. 3 graph.

The major part of the length within the standard schedule pipe 19 in the lower compartment of the package 5 is swept by the band or screw. This placement is done by placing the spider 36 at the city feed water side of the inlet so that the band extends through the box. The spider 36, as shown in FIG. 2, is effectively locked at the narrow taper portion of the adapter 28 to thereby immobilize the impeller counter to the water flow. The impeller assembly is shown at the left bottom of FIG. 2 and comprises lock nut 33, backwasher 35, graphite bearing 31, which provide the fixed seat for the helical band 30 and its shaft which rotates in the bearings 31.

The spiral band 30 of the helix provides an inner surface which resists flow in the direction of the arrow, e.g., city water into the lower compartment to rotate at the flow in FIG. 3. The close spacing and the rotation provide a sweeping action. The action goes along the entire conduit length. The induced magnetic field from the constant field impressed by the winding 39 fed with 24 volt DC effectively suspends the particles which respond to the magnetic fields and to the rotational sweeping action.

---

Relationship of Minimum Flow, Maximum Flow and Optimum Flow for Best Impeller Performance

---

It has been empirically determined that the following flow factors influence impeller performance:
1. A minimum velocity of at least about 1.1 feet per second in one inch pipe and an optimum of 4.5 feet per second.
2. The minimum of 1.1 feet per second represents about 2.7 gallons per minute for one inch pipe at the optimum.
3. The maximum above which one runs into excess liquid channeling and mechanical breaking of the impeller, etc., is a velocity of about 4.6 feet per second for one inch pipe, this representing about 13.4 gallons per minute for the two inch pipe.
4. The optimum for home use, one inch pipe, is at about 4 feet per second for 10 gallons per minute; the optimum for home use is about 7 feet per second or about 62.6 gallons per minute for a two inch pipe.

Velocity, gallons per minute (flow rate) and conduit cross section relate as follows, based upon $Q = A \times V$:

| Nominal Size | V=1 fps | V=2 fps | V=4 fps | V=6 fps | V=8 fps | V=10 fps |
|---|---|---|---|---|---|---|
| 1" | 2.49 | 4.98 | 9.96 | 14.81 | 20.00 | 24.81 |
| 1¼" | 4.17 | 8.33 | 16.68 | 25.01 | 33.35 | 41.70 |
| 1½" | 5.58 | 11.16 | 22.32 | 33.48 | 44.64 | 55.80 |
| 2" | 9.54 | 19.09 | 37.42 | 56.51 | 75.6 | 95.00 |

Relationship of Outer Diameter to Inner Diameter Standard Schedule Pipe

| Nominal Size | Inner Diameter |
|---|---|
| 1" | .965 |
| 1¼" | 1.305 |
| 1½" | 1.510 |
| 2" | 1.955 |

The basic formula is $q = 2.448 \, d^2 \, V$
where  q = quantity rate flow, gallons per minute
d = actual inside diameter of the pipe in inches
V = velocity of flow, feet per second (fps)

Minimum amount of gallons per minute needed for driving the impeller:

| d | Minimum | Maximum | Optimum |
|---|---|---|---|
| 1" | 2.69 | 13.40 | 10.00 |
| 1¼" | 4.66 | 37.2 | 27.90 |
| 1½" | 6.34 | 50.8 | 38.00 |
| 2" | 9.79 | 83.6 | 62.60 |

In the physical embodiment disclosed in FIG. 5, the water conditioner package 105 comprises box 106, top wall 107, bottom wall 108, side walls 113 and 115, partition 127, coupling pipe 119 and 120, electrical conductor 121 connecting with step down transformer 153 located in upper compartment 123, and electromagnet coil 139 and leads 141 and 143 housed in lower compartment 140. A pilot light 155 and fuse 157 are located in the upper part of box 106. The major part of the length within the conduit 114 and 120 in the package is swept by placing spider 132 at the city feed water inlet so that a solid helical screw impeller extends through a major portion of the conduit. The impeller assembly comprises a lock nut 133, lockwasher 135, elongated graphite bearing 131, which provide the fixed seat for the solid helical screw impeller 130 and its shaft which rotates in graphite bearings 131. The solid helical screw impeller is made of ferromagnetic material and has very close tolerance (about 1/16 inch) with the wall of inlet pipe 119 thereby sweeping the inner wall free from particles which tend to deposit on the wall, thus providing a positive sweeping action. The induced magnetic field impressed by the winding 139 fed with 24 volt DC effectively suspends the particles which respond to the magnetic fields and to the rotational sweeping action of the helical impeller 130.

Referring to the details of the package unit water conditioner 105 of FIG. 5, it will be noted that partition 127 divides the box 106 into upper compartment 123 and lower compartment 140 in the ratio of approximately one third to two thirds of the volume of the entire casing. This facilitates servicing of the components within the respective compartments. The lower compartment 140 is further provided with insulation for protection of corrosion of the components therein. Such insulation is found to be effective under climatic conditions of high humidity and high temperatures and also due to heat dissipated by coil 139. The insulation provided therein comprises fiberglass wool 137 of about ⅜ inch and heat resistant fiber backing 142 in waffle weave of about 1/16 inch adhesively secured to side walls 113 and bottom wall 109. The electromagnetic coil 139 is insulated and thermally and electrically encapsulated with a rigid coated resin of ⅛ to ¼ inch thickness of styrene polyester, reinforced with chopped fiberglass ranging in size from ⅛ to 1/32 inch long. It has been discovered that for optimum performance, an electromagnetic coil having a 15 Ampere rating of 1000 turns of aluminum magnet wire and operating on 4 Amperes 24 volt DC will provide most effective electromagnetic water treatment for one inch diameter pipe. For a 1½ inch diameter pipe, an electromagnet coil of aluminum magnetic wire having a 20 Ampere rating and 1400 turns of wire used 5 Amperes, and provides satisfactory service. For a 2 inch diameter pipe, an electromagnet coil of 50 Ampere rating and 1050 turns of aluminum magnet wire uses 10 Amperes with very successful results.

In carrying out the proper engineering design and construction for the helical impeller formed of ferromagnetic material one must keep in mind that the band will break if the flow goes beyond the maximum and especially if the water in the larger pipe sizes (2", for example) is turned on suddenly. Obviously, where the flow rate is below the minimum based upon water restrictions in a particular locality, the larger diameter unit must be replaced by a smaller diameter unit.

From the above description of the embodiments of FIGS. 2 and 5 it is clear that these embodiments have the same basic impeller arrangement but the propeller type structure 130 which is formed as a solid helical screw in FIG. 5 rather than the helical coil 30 in FIG. 2 provides a more positive response to water pressure because of its solid curved flight surface resisting municipal water pressure.

The packaging is improved in FIG. 5 over FIG. 2 by virtue of the waffle weave heat resistant fiber backing 142 which serves to absorb moisture under high humidity conditions. The inner container structure is lined with this waffle weave fiber 142 on all inner panel surfaces of the container provides further protection for the electromagnetic coil 139.

I claim:

1. A unitary special package for attachment to a home hot water heater between a municipal water line and the water inlet of the heater comprising:

a package casing having a top, a bottom and sides therebetween enclosing electrical conversion AC to DC machinery and an electromagnetic assembly about a straight pipe section in the package adapted for water treatment inside the casing;

an upper compartment immediately below the top of said casing in which is mounted a step-down transformer converting 110–220 volts to 24 ± 4 volts AC, a plug and lead from AC house current to 110–220 volts AC into said transformer, and a DC rectifier converting said 24 volt input into a DC output for energizing a coil in a lower compartment of the package;

a lower compartment containing a straight pipe section between the casing sides which projects from the sides and thus forms a straight line for direct connection between the municipal water line and the inlet line to the hot water heater;

a horizontal wall provided with openings separating said upper and lower compartments and electrical lead lines passing through said openings between the rectifier and the coil;

said straight pipe section being surrounded by a magnet wire winding consisting of aluminum wire which is insulated and extends along substantially the entire length of said section within the package, said coil fed by the electrical lead lines passing through said openings to thereby create a 24 volt DC magnetic field within the interior of said pipe section through which the water flows;

a tapered sleeve adapter fitting into said straight pipe section within said package; and an elongated impeller journaled in bearings in a spider and formed as a helical screw having 2½ turns and spaced at 1/16 inch from the inside wall of the pipe section which rotates responsive to incoming municipal water flow, said spider being locked at the narrow tapered portion of said adapter to immobilize the impeller counter to water inflow, and the projecting ends of said pipe section adapting the coupling of said pipe section in said unitary package to municipal water and the heater.

2. A unitary special package for attachment to a home hot water heater between a municipal water line and the water inlet of the heater comprising:

a package casing having a top, a bottom and sides therebetween enclosing electrical conversion AC to DC machinery and an electromagnetic assembly about a straight pipe section in the package adapted by a spiral band and surrounding coil for water treatment inside said casing;

an upper compartment immediately below the top of said casing in which is mounted a step-down transformer converting 110–220 volts to 24 ± 4 volts AC, a plug and lead from AC house current to 110–220 volts AC into said transformer, a DC rectifier converting said 24 volt input into a DC output for energizing a coil in a lower compartment of the package, and a monitoring light indicating rectifier current;

a lower compartment containing a straight pipe section between said sides which projects from the sides and thus forms a straight line connecting the municipal water line and the inlet line to the hot water heater;

a horizontal wall provided with openings separating said upper and lower compartments and electrical lead lines passing through said openings between the rectifier in the upper compartment and the coil in the lower compartment;

said straight pipe section being surrounded by an insulated magnet wire winding consisting of aluminum wire which extends along substantially the entire length of said section within the package, said coil fed by the electrical lead lines passing through said openings to thereby create a 24 volt DC magnetic field within the interior of said pipe section through which the water flows;

a tapered sleeve adapter fitting into said straight pipe section within said package which packages an impeller responsive to water pressure in said section; and an elongated impeller journaled in bearings in a spider and formed as a spiral band having 2½ turns and spaced at 1/16 inch from the inner wall of said pipe section which rotates responsive to incoming municipal water flow, said spider being locked at the narrow tapered portion of said adapter to immobilize the impeller counter to water inflow, and the projecting ends of said pipe section adapting the coupling of said pipe section in said unitary package to municipal water and the heater.

3. A unitary special package for attachment to a home hot water heater between a municipal water line and the water inlet of the heater comprising:

an elongated rectangular casing having a top, a bottom and two opposing sides therebetween enclosing electrical conversion AC to DC machinery and an electromagnetic assembly about a straight pipe section in the package adapted for water treatment inside said casing;

an upper compartment immediately below the rectangular top in which is mounted a step-down transformer converting 110–220 volts to 24 ± 4 volts AC, a plug and lead from AC house current at 110–220 volts AC into said transformer, a DC rectifier converting said 24 volt input into a DC output for energizing a coil in a lower compartment of the package, and a monitoring light indicating rectifier current;

a lower compartment containing a straight pipe section between said sides which projects from the sides and thus forms a straight line connecting the municipal water line and the inlet line to the hot water heater;

a horizontal wall provided with openings separating said upper and lower compartments and electrical lead lines passing through said openings between the rectifier in the upper compartment and the coil in the lower compartment;

said straight pipe section being surrounded by an insulated magnet wire winding consisting of aluminum wire which extends along substantially the entire length of said section within the package, said coil fed by the electrical lead lines passing through said openings to thereby create a 24 volt DC magnetic field within the interior of said pipe section through which the water flows;

a tapered sleeve adapter fitting into said straight pipe section within said package which packages an impeller responsive to water pressure in said section; and an elongated impeller journaled in bearings in a spider and formed as a helical screw having 2½ turns and spaced at 1/16 inch from the inner wall of the pipe section which rotates responsive to incoming municipal water flow because the first turn starts close to said inner wall, said spider being locked at the narrow tapered portion of said adapter sleeve to immobilize the impeller counter to water inflow, and the projecting ends of said pipe section adapting the coupling of said pipe section in said unitary package to municipal water and the heater.

4. A unitary special package as claimed in claim 3 wherein said coil is insulated with cured styrene-polyester resin in a thickness which completely surrounds said winding to provide a moisture resistant.

5. A unitary package as claimed in claim 4 wherein said upper compartment comprises about one-third of the total volume of said package and said lower compartment comprises about two-thirds of the total volume.

6. A unitary package as claimed in claim 5 wherein said lower compartment is insulated with absorbent mineral wool batts adhered to the top, bottom and sides of the lower compartment.

7. A unitary package as claimed in claim 6 wherein the diameter of said straight pipe section is about one inch and the projecting ends are threaded.

8. A unitary package as claimed in claim 7 wherein a fuse is inserted in the line between the leads to the transformer and the incoming house current, said fuse being mounted in a side wall of the casing to be visible from the outside of the package for replacement when necessary.

9. A unitary package as claimed in claim 8 wherein said monitoring light indicating rectified current fed to said coil is mounted on a side wall of the casing to be visible for showing coil operation to create the magnetic field in said pipe section.

10. A unitary package as claimed in claim 9 wherein said monitoring light and said fuse are both mounted on the same wall which is the wall at which the protruding pipe section connects to municipal water.

11. A unitary package as claimed in claim 4 wherein said pipe section has a diameter of about 1 inch.

12. A unitary package as claimed in claim 4 wherein said pipe section has a diameter between 1¼ inch and 1½ inch.

13. A unitary package as claimed in claim 4 wherein said pipe section has a diameter of about 2 inches.

14. A method for manufacturing a unitary special package for attachment to a hot water heater between a municipal water line and the water inlet of the heater comprising:

providing an adapter sleeve to frictionally fit the impeller means in the pipe section at the end nearest the incoming water;

mounting an impeller formed as a helical screw having 2½ turns and spaced at 1/16 inch from the inner wall of the pipe section which rotates responsive to incoming municipal water flow because the first turn starts close to said wall and journaled on a graphite bearing in said adapter sleeve to secure said impeller means in said pipe section;

providing a spider which is locked at the narrow tapered portion of said adapter sleeve to immobilize the impeller counter to water inflow, and the projecting ends of said pipe section adapting the coupling of said pipe section in said unitary package to municipal water and the heater;

winding aluminum magnet wire in a coil to fit about said pipe section to form a coil having projecting leads at the ends thereof;

impregnating said magnet wire with curable styrene polyester resin reinforced with chopped fiber glass;

placing said impregnated coil, adapter sleeve and impeller means in a cylindrical coil housing;

mounting said housing in the lower portion of a unitary rectangular box; and separating the lower portion of said box from the upper portion by installing a barrier through which the leads of said coil project and connecting the leads of said coil to a DC rectifier fed from a transformer converting 110 volts AC current to 24 volts DC current for energizing said coil, said rectifier and transformer being packaged above said barrier.

* * * * *